United States Patent [19]

Irbinskas

[11] Patent Number: 5,706,764
[45] Date of Patent: Jan. 13, 1998

[54] ANIMAL TRAINING ASSIST APPARATUS

[76] Inventor: Heather Irbinskas, 9415 E. Wrightstown Rd., Tucson, Ariz. 85715

[21] Appl. No.: 732,110

[22] Filed: Oct. 15, 1996

[51] Int. Cl.$^6$ ........................................ A01K 27/00
[52] U.S. Cl. ........................................ 119/792
[58] Field of Search ............... 119/792, 793, 119/794, 795, 796, 797, 798, 799, 769, 770, 771, 786, 781, 784, 785, 788, 791

[56] References Cited

U.S. PATENT DOCUMENTS

| | | | |
|---|---|---|---|
| 2,593,940 | 4/1952 | Van Meter | 119/799 |
| 2,737,154 | 3/1956 | Michonski | 119/798 |

FOREIGN PATENT DOCUMENTS

| | | | |
|---|---|---|---|
| 367049 | 2/1932 | United Kingdom | 119/798 |

*Primary Examiner*—Thomas Price

[57] ABSTRACT

A dog or animal training apparatus which assists in absorbing and transferring the animal's energy so that the full impact is not felt by the trainer/handler. The apparatus provides an elastic member which is connected between the leash/lead and the animal's collar. If the animal leans into the leash, the elastic member pulls back on the collar to bring the animal back into line. Should the animal bolt or jump, the elastic member elongates to keep the immediacy of the impact from being transferred to the trainer/handler and to redirect some of the impact back to the animal to pull the animal into proper position.

15 Claims, 4 Drawing Sheets

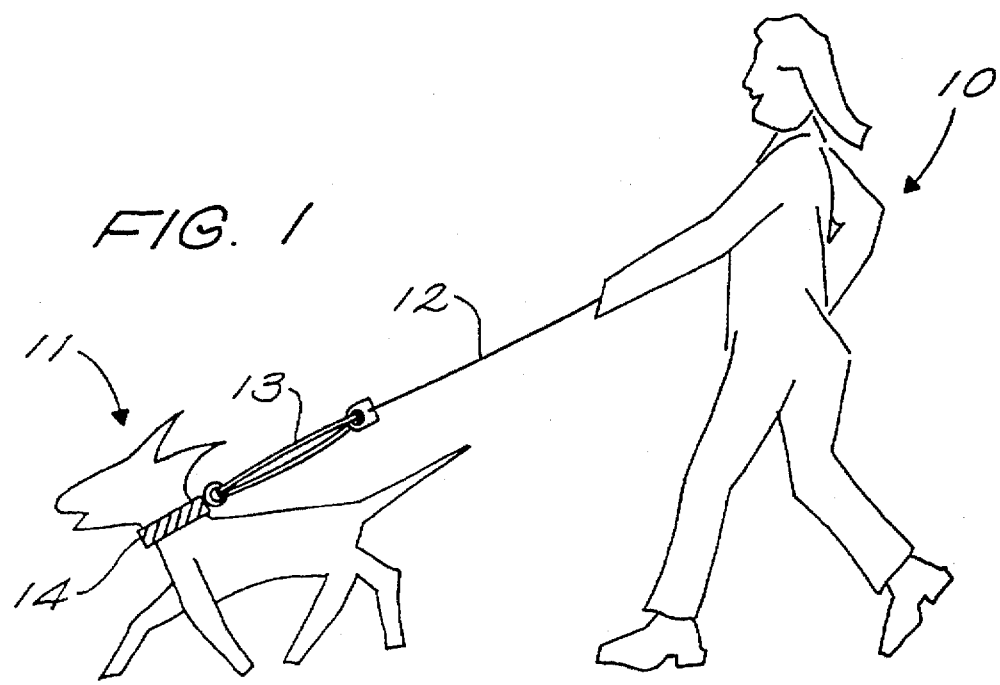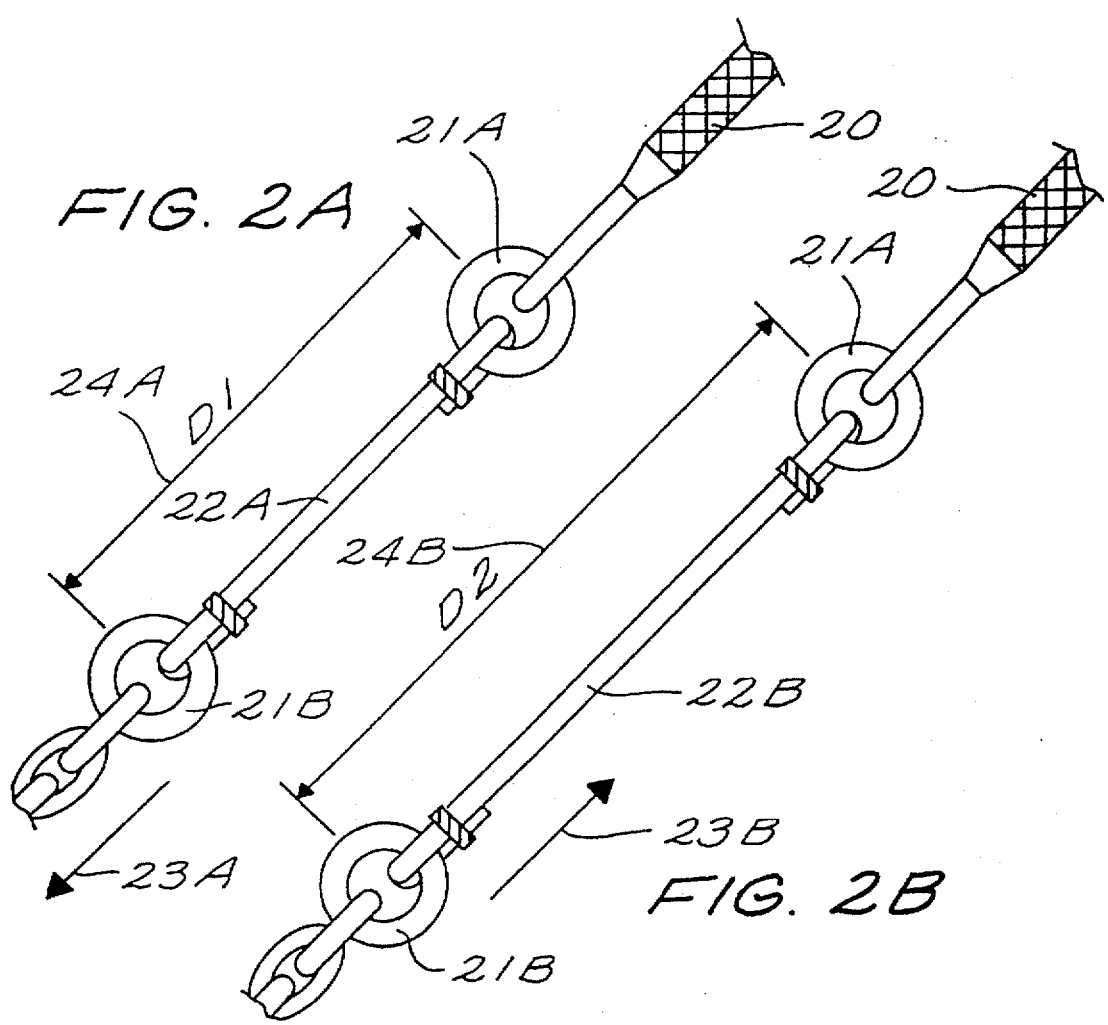

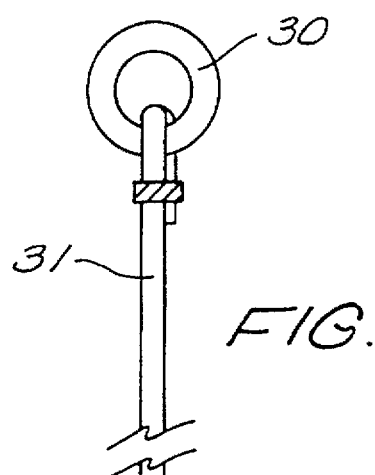
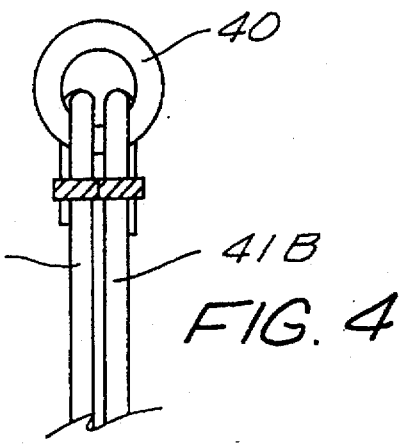
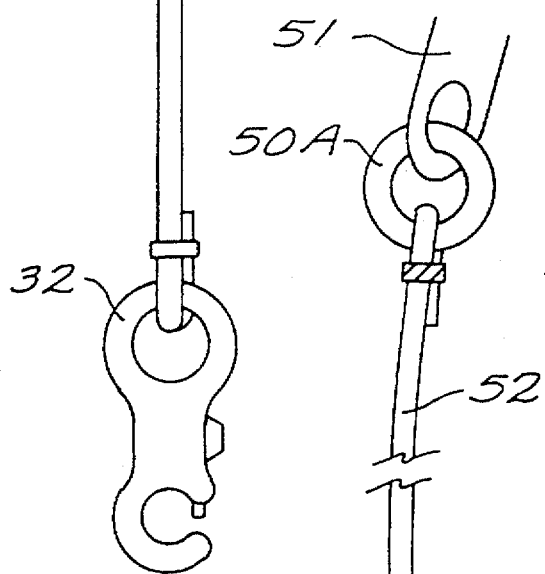
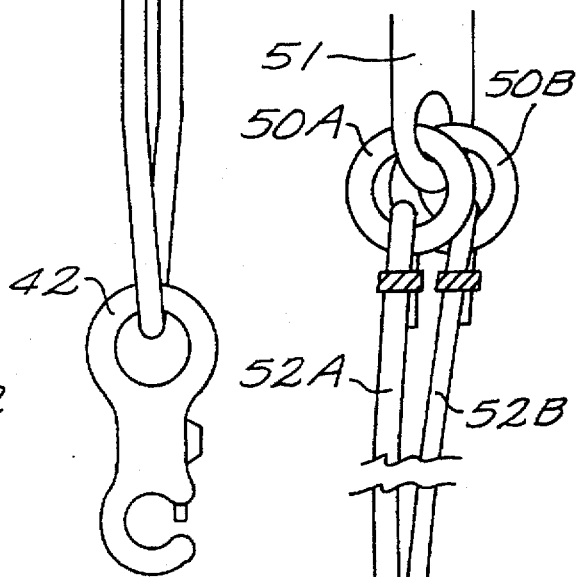
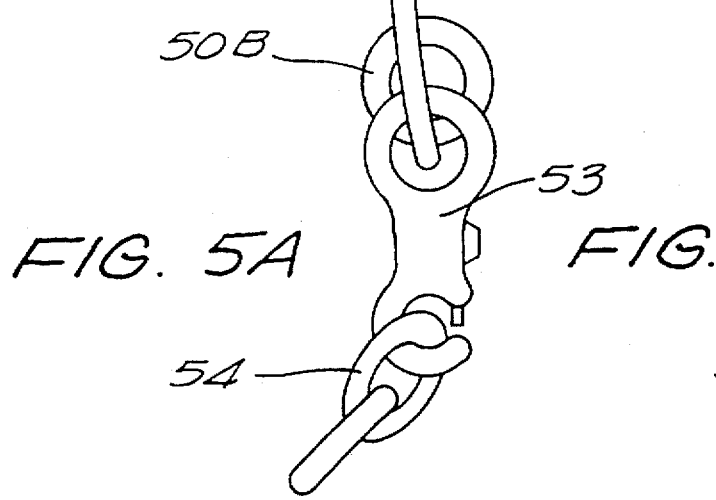

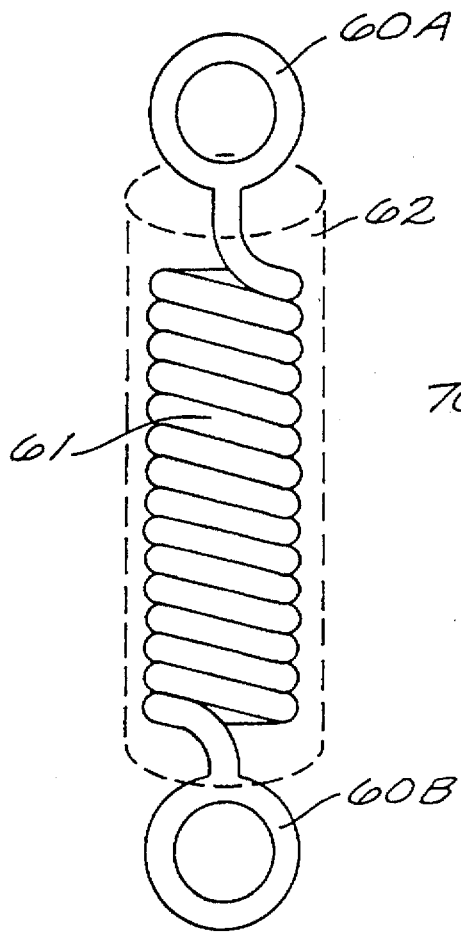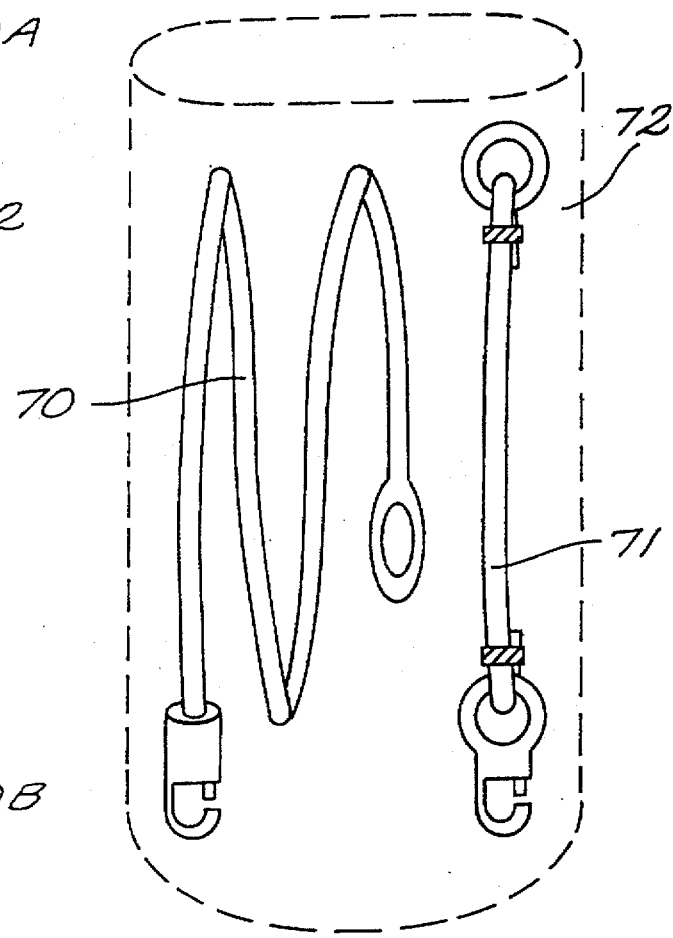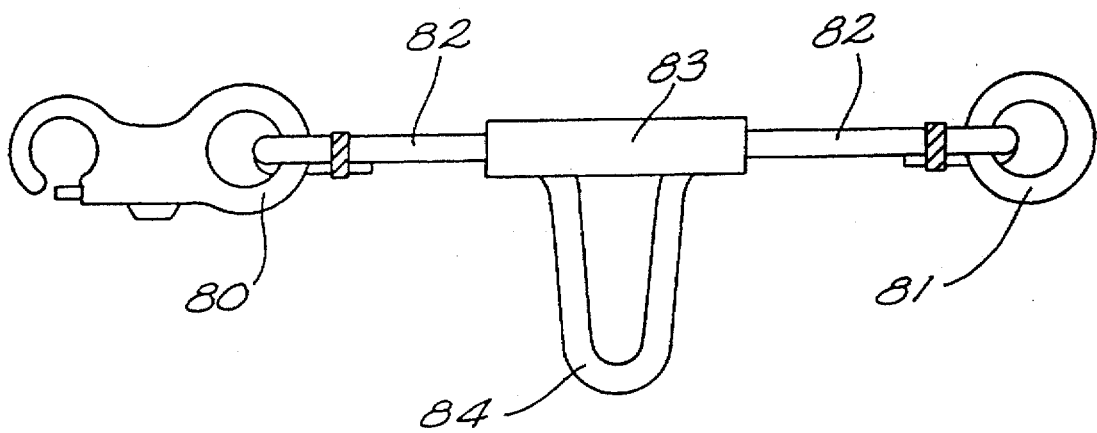

ANIMAL TRAINING ASSIST APPARATUS

BACKGROUND

This application is continuation-in-part of the provisional patent application filed May 30, 1996, by Irbinskas and entitled "Dog Training Assist Apparatus", and assigned the application Ser. No. of 60/018,895.

This invention relates generally to animal training apparatus and more particularly to apparatus used for the training of dogs.

The training of dogs to respect the leash is one of the major objectives in any dog obedience class. In a typical situation, the trainer uses a long lead or leash which is held gathered in one hand. If the dog looses concentration and starts to wander from the trainer, the trainer abruptly changes direction and drops the slack lead. When the trainer reaches the end of the slack lead, the dog's choker is jerked taut and the animal's attention is regained.

Although the procedure works well for small dogs or where the trainer is much stronger than the dog, when the size and strength of the dog approaches or exceeds the trainer, the technique has the opposite affect as the trainer is often pulled off his/her feet.

It is clear that there is a need for an effective mechanism which will permit a trainer of small proportions to train dogs of any size.

SUMMARY OF THE INVENTION

The present invention creates a canine training device, that humanely curbs the dog's tendency to pull on the leash; further, the apparatus turns every leash into a training tool.

Within the present discussion, the invention is described as used in the training and control of dogs. The invention is not intended to be limited solely to dogs but pertains to the training of almost any animal including: horses, cattle, sheep, goats, hogs, and many others which are well known in the art.

The apparatus of the present invention is a dog training apparatus which assists in absorbing and transferring the animals energy so that the full impact is not felt by the trainer or handler.

The invention provides an elastic member which is connected between the leash/lead and the animal's collar. The elastic member is an elongated "cord" which has a relaxed state or length. The elastic member permits itself to be stretched from its relaxed state, but, a counter force is provided in the elastic member attempting to return the elastic member to return to its relaxed length.

This counter force is referred to as a contracting force. During manufacture of the apparatus, the parameters of the contracting force are chosen to address the particular animal where the apparatus is going to be used. In the preferred embodiment, the contracting force is less than one-fifth the weight of the animal. As example, in controlling a hundred pound airedale, the ideal contracting force is twenty pounds or less.

Also, during design and manufacture of the apparatus, the preferred embodiment establishes certain parameters for the maximum elongation of the elastic member. In the preferred embodiment, the maximum elongation is approximately one hundred twenty-five percent of the relaxed length of the elastic member.

This limit on the elastic length prevents the animal from exerting a shock force against the handler.

If the animal leans into the leash, the elastic member gently pulls on the collar to bring the animal back into line. The pressure applied to bring the animal back is more gentle and progressive rather than the sudden jolt that a leash alone would create.

The pull back pressure is also dampened and not applied directly against the trainer as the animal begins to feel the pull back instantly and naturally responds to the pressure.

Should the animal bolt or jump, the elastic member elongates to keep the immediacy of the impact from the trainer/handler and to redirect some of the impact back to the animal to pull the animal into proper position.

This attribute of the present invention is particularly advantageous for the training of larger animals since in a traditional setting, a large animal can easily overpower the trainer and the session degenerates into a pulling match between the animal and the trainer.

On the other end of the spectrum, the present invention is also advantageous for extremely small animals where it is very easy for the trainer to "whip" the leash and apply too much corrective force against the small animal. The elastic cord in this application is extremely elastic and provides the proper corrective pressure without requiring the trainer to delicately adjust the force being applied.

In the apparatus, various thickness' and length's of elastic cord are selected according to size of dog. At the end of the elastic cord, a snap mechanism is secured and a ring is secured to the other end. The assemblage is then positioned between the leash or lead and the dog's collar.

During the training exercise, as the dog pulls against the leash, there is created (due to the elastic nature of the cord) a natural return force is established. The dog quickly learns that by simply following the lead, the pressure is decreased or eliminated.

Further, during the training exercise, the elastic nature of the invention acts as a shock absorber so that the trainer does not feel the entire force of the animal's strength.

This unique training devise allows the human to comfortably walk his/her dog and train him/her to heel. When the dog hits the end of the elastic cord, the device immediately corrects the dog back with a much more humane and prompt reaction than a choke collar.

This device also takes the shock away from the handler when walking strong dogs, and is especially gentle when training puppies to walk on a lead. The correction is gentle but effective.

The invention, and various embodiments thereof are more clearly shown by the accompanying drawings and the following descriptions.

DRAWINGS IN BRIEF

FIG. 1 is a view of an embodiment of the invention in use with a dog.

FIGS. 2A and 2B are side views of an embodiment of the invention illustrating the elongation of the elastic member.

FIG. 3 is a side view of the preferred embodiment of the invention.

FIG. 4 is a side view of an alternative embodiment of the invention.

FIGS. 5A and 5B are side views of an embodiment of the invention arranged to provide adjustable contracting force.

FIG. 6 is a side view of an embodiment of the invention utilizing a spring member.

FIG. 7 is a graphical representation of the kit embodiment of this invention.

FIG. 8 is a side view of an embodiment which permits its length to be adjusted by the trainer.

DRAWINGS IN DETAIL

Figure 9:
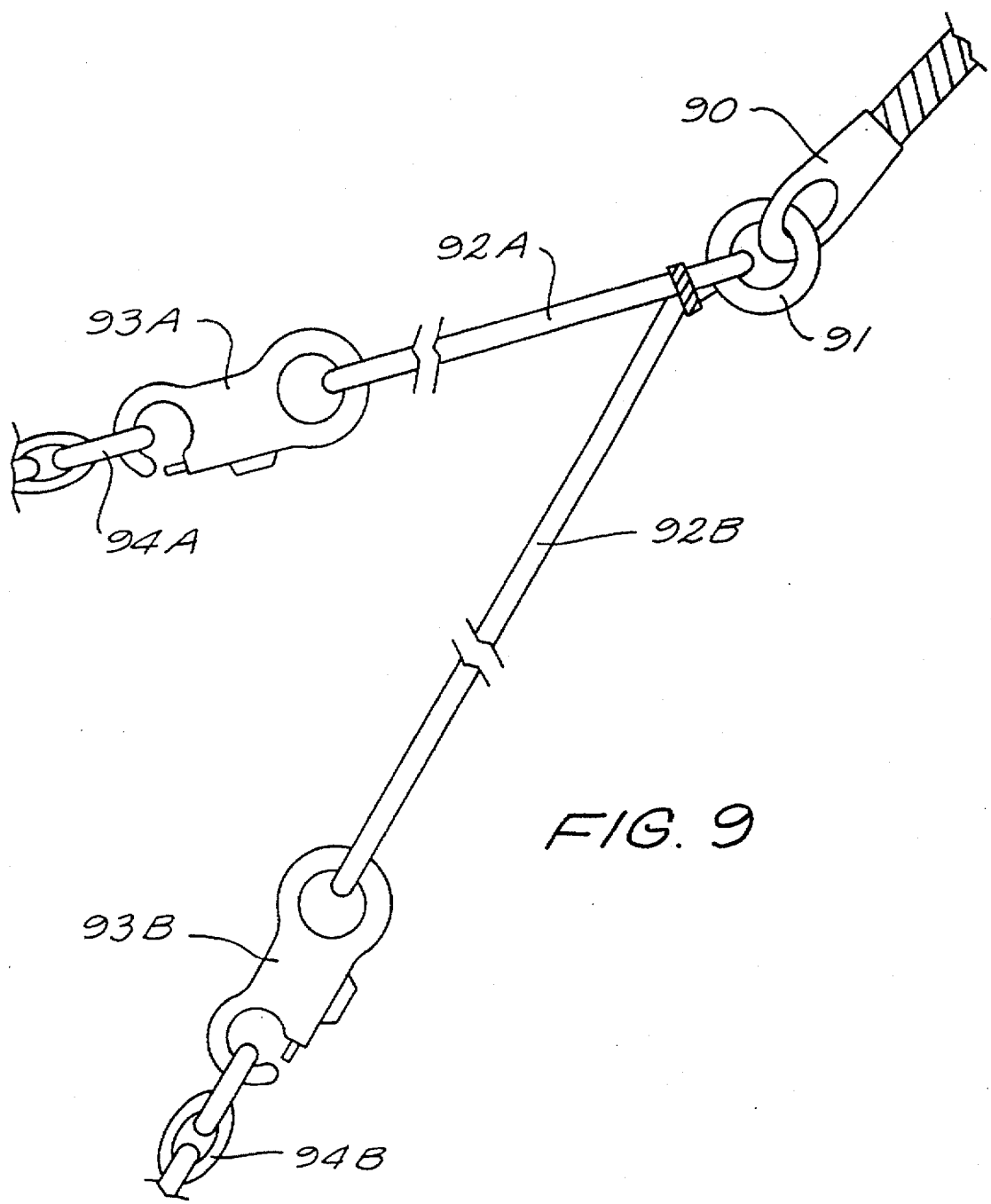
FIG. 9 is a side view of an embodiment of the invention as used for a brace of dogs.

FIG. 1 is a view of an embodiment of the invention in use with a dog.

As shown, handler 10 controls dog 11 using leash 12 which is connected to collar 14 via training apparatus 13. Training apparatus 13 is an elastic member which is connected to both the leash and the collar. As dog 11 jerks away from handler 10, training apparatus 13 exerts a counter force to gently pull dog 11 back into position.

FIGS. 2A and 2B are side views of an embodiment of the invention illustrating the elongation of the elastic member.

The relaxed state is shown in FIG. 2A. Elastic member 22A is relaxed and has a length D1, 24A, between rings 21A and 21B.

In this embodiment, elastic member 22A has ring 21A which is securable to leash 20. Ring 21B forms one ring for a choker collar which is placed around the dog's neck (not shown). A choker collar consists of two rings attached to each other by a chain. The chain is looped through one ring to form a "noose" which is used as the collar for animal.

As the dog pulls onto ring 21B, as shown by arrow 23A, the elastic member elongates as shown in FIG. 2B, to have a distance D2, 24B. In an elongated state, elastic member 22B exerts as contracting force illustrated by arrow 23B. The contracting force attempts to return the elastic member to the condition illustrated in FIG. 2A.

The contracting force, as illustrated by arrow 23B, is what pulls the animal back into proper positioning without causing the trainer to feel the full impact of a sudden movement on the part of the dog.

FIG. 3 is a side view of the preferred embodiment of the invention.

In this embodiment, a single length of elastic material 31, such as "bungee" material, is extended from ring 30 to snap lock 32. This embodiment allows the training apparatus to be secured to a leash via ring 30 and then attached to the animal's collar via snap ring 32.

In this embodiment, the elastic material is chosen to provide a contracting force suitable for the particular animal being trained. In this preferred embodiment, the contracting force is less than one-fifth the weight of the animal.

Also, the preferred embodiment has a maximum elongation of approximately one hundred twenty-five percent of the relaxed length of the elastic member. This limit on the elastic length prevents the animal from exerting a shock force against the handler.

FIG. 4 is a side view of an alternative embodiment of the invention.

In this embodiment, the elastic member is secured to ring 40 and is then looped through snap ring 42 to form strand 41A and 41B. The use of two strands provides for a doubling of the force which may be exerted for contracting to the relaxed state.

FIGS. 5A and 5B are side views of an embodiment of the invention arranged to provide adjustable contracting force.

As shown in FIG. 5A, leash 51 is secured to ring 50A which is secured to elastic material 52. Ring 50B is attached to a second end of elastic material 52. In this configuration, ring 50B is pulled tight against snap ring 53 which is secured to collar 54.

To double the contracting force, as shown in FIG. 5B, ring 50B is also attached to leash 51 creating stands 52A and 52B which provide the contracting force.

This embodiment, shown in FIGS. 5A and 5B, permits the trainer to selectively adjust the contracting force which is applied in the training of the animal.

FIG. 6 is a side view of an embodiment of the invention utilizing a spring member.

Spring member 61 is provided with rings 60A and 60B which are adapted to be attached to the leash and collar respectively. Rings 60A and 60B can be pulled to extend spring 61 at which time spring 61 exerts a contracting force.

To prevent the animal's hair from becoming snagged in spring 61, sheath 62 encircles spring 61. Sheath 62 is preferably a plastic cylinder.

FIG. 7 is a graphical representation of the kit embodiment of this invention.

In a retail setting, a consumer is given the opportunity to acquire leash 70 with the training apparatus 71 in one package 72. The combination provides the user with the necessary components for effectively training the animal.

Preferably, leash 70 and training apparatus 71 are chosen to address a particular range of weight for the animal to be controlled. This information is provided on package 72 so that the purchaser obtains the proper equipment for the particular dog.

FIG. 8 is a side view of an embodiment which permits its length to be adjusted by the trainer.

As before, snap ring 80 is connected by elastic material 82 to ring 81. In this embodiment though, a connector 83 permits the user to selective form loop 84 of elastic material. Connector 83 permits the force to be directly passed therethrough and allows loop 84 to remain in a relaxed state. In this manner, connector 83 creates a means for the user to selectively adjust the length and tension of elastic material 82.

In this manner, the trainer is able to extend or contract loop 84 and adjust the overall length between snap ring 80 and ring 81.

FIG. 9 is a side view of an embodiment of the invention as used for a brace of dogs.

Handler uses leash 90 which is attached to ring 91. In this embodiment, two elastic members 92A and 92B extend from ring 91. Each elastic member, 92A and 92B, address one dog and is equipped with its own snap attachment, 93A and 93B respectively, which is secured to collars 94A and 94B respectively.

This embodiment is useful for training of two dogs to work in a brace arrangement.

It is clear that the present invention creates a highly improved training apparatus for dogs and other animals.

What is claimed is:

1. An animal control apparatus comprising:
   a) a collar for encircling a neck of an animal;
   b) a lead adapted to be grasped by a handler;
   c) an elastic member connecting said lead to said collar, said elastic member adapted to elongate under a stretching force and exerting a contraction force tending to forcibly retract said elastic member to a relaxed length; and,
   d) means for adjusting a length of said elastic member.

2. The animal control apparatus according to claim 1 wherein said contraction force is less than one-fifth of a weight of the animal.

3. The animal control apparatus according to claim 2 wherein said elastic member is adapted to elongate less than twenty-five percent of a relaxed length of said elastic member.

4. The animal control apparatus according to claim 3:
   a) wherein said collar includes a ring;
   b) wherein said lead includes a snap attachment; and,
   c) wherein said elastic member has a ring attachment secured to a first end and a snap attachment secured to an opposing second end.

5. An animal control apparatus comprising:
   a) a collar for encircling a neck of an animal;
   b) a lead adapted to be grasped by a handler; and
   c) an elastic member connecting said lead to said collar, said elastic member adapted to elongate under a stretching force and exerting a contraction force tending to forcibly retract said elastic member to a relaxed length and including:
      1) a first ring secured to a first end of said elastic member,
      2) a second ring secured to a second end of said elastic member, and
      3) a snap attachment slideably secured to a mid-portion of said elastic member.

6. The animal control apparatus according to claim 5 wherein said lead includes:
   a) a first end adapted to be grasped by the user; and,
   b) a second end having a snap connector connected thereto and adapted to be selectively secured to said first ring and the second ring of said elastic member.

7. A dog control apparatus comprising:
   a) a collar for encircling a neck of a dog having a first end, said collar adapted to tighten around the neck of said dog when a pulling force is applied to the first end of said collar;
   b) a leash having a first end and a second end, the first end of said leash having a handle portion adapted to be grasped by a handler; and,
   c) an elastic member having at least two parallel elastic strands, each of said elastic strands having a first end connected to the second end of said leash and a second end connected to the first end of said collar, said elastic member adapted to elongate under a stretching force and exerting a contraction force tending to forcibly retract said elastic member to a relaxed length.

8. The dog control apparatus according to claim 7 wherein said contracting force of said elastic member is less than one-fifth of a weight of the dog and said elastic member is adapted to elongate less than thirty percent of a relaxed length of said elastic member.

9. The dog control apparatus according to claim 8:
   a) wherein said collar includes a ring on the first end thereof;
   b) wherein said leash includes the snap attachment on a second end thereof; and,
   c) wherein said elastic member has a ring attachment on the first end thereof and a snap attachment secured to the second end of said elastic member.

10. The dog control apparatus according to claim 9 wherein said elastic member further includes means for adjusting a length of said elastic member.

11. The dog control apparatus according to claim 7 wherein said elastic member includes means for adjusting said contracting force.

12. The dog control apparatus according to claim 7 wherein said elastic member includes:
   a) a first ring secured to a first end of said elastic member;
   b) a second ring secured to a second end of said elastic member; and,
   c) a snap attachment slideably secured to a mid-portion of said elastic member.

13. The dog control apparatus according to claim 12 wherein said leash includes:
   a) said first end adapted to be grasped by the user; and,
   b) a second end having a snap connector connected thereto and adapted to be selectively secured to said first ring and the second ring of said elastic member.

14. The dog control apparatus according to claim 7 further including:
   a) a second collar for encircling a neck of a second dog having a first end, said second collar adapted to tighten around the neck of said second dog when a pulling force is applied to the first end of said collar; and,
   b) a second elastic member having a first end connected to the second end of said leash and a second end connected to the first end of the second collar, said second elastic member adapted to elongate under a stretching force and exerting a contraction force tending to forcibly retract said second elastic member to a relaxed length.

15. A kit for use in dog training comprising:
   a) a leash having a first end and a second end, the first end of said leash having a handle portion adapted to be grasped by a handler; and,
   b) an elastic member having at least two elastic strands, each of said elastic strands having a first end connectable to the second end of said leash and a second end connectable to a dog collar, said elastic member adapted to elongate under a stretching force and exerting a contraction force tending to forcibly retract said elastic member to a relaxed length.

* * * * *